(12) United States Patent
Takahashi

(10) Patent No.: US 6,554,712 B1
(45) Date of Patent: Apr. 29, 2003

(54) GAME SYSTEM USING COMMUNICATION NETWORK

(75) Inventor: Masayuki Takahashi, Tokyo (JP)

(73) Assignee: Konami Corporation, Tokyo (JP)

( * ) Notice: Subject to any disclaimer, the term of this patent is extended or adjusted under 35 U.S.C. 154(b) by 337 days.

(21) Appl. No.: 09/706,932

(22) Filed: Nov. 6, 2000

(30) Foreign Application Priority Data

Nov. 8, 1999 (JP) .......................................... 11-317192

(51) Int. Cl.[7] ................................................ A63F 13/00
(52) U.S. Cl. ............................................ 463/43; 463/29
(58) Field of Search ................. 463/41–47, 1, 463/29

(56) References Cited

U.S. PATENT DOCUMENTS

| | | | |
|---|---|---|---|
| 5,428,528 A | * | 6/1995 | Takenouchi et al. .......... 463/42 |
| 5,674,127 A | | 10/1997 | Horstmann et al. |
| 5,899,810 A | | 5/1999 | Smith |
| 6,015,348 A | | 1/2000 | Lambright et al. |
| 6,406,372 B1 | * | 6/2002 | Turmell et al. ............... 463/43 |
| 6,500,070 B1 | * | 12/2002 | Tomizawa et al. ............ 463/43 |
| 6,508,711 B1 | * | 1/2003 | Ono ............................. 463/43 |

FOREIGN PATENT DOCUMENTS

| | | |
|---|---|---|
| JP | 01091888 | 4/1989 |
| JP | 677362 | 10/1994 |
| JP | 10151274 | 6/1996 |
| WO | 93 23125 | 11/1993 |
| WO | 94 12256 | 6/1994 |

* cited by examiner

Primary Examiner—John M Hotaling, II
(74) Attorney, Agent, or Firm—Jordan and Hamburg LLP

(57) ABSTRACT

A match play type of game system is provided which is configured with three or more portable game apparatuses. The game system comprises a plurality of master game apparatuses connected to each other via communication means using a wire and one or more slave game apparatuses each connected to each master game apparatus via communication means on infrared rays. In playing a game, the one or more slave game apparatuses make up a single team with each master game apparatus connected thereto. Each of the master and slave game apparatuses is made up of, by way of example, a portable type of game apparatus. The infrared rays communication means provided with each potable game apparatus is effectively used to play a match game.

5 Claims, 9 Drawing Sheets

FIG. 8(A)

| TITLE OF ACTION COMMAND | CONTENT OF ACTION COMMAND INFORMATION | CONTENT OF ACTION COMMAND CALCULATION | CONTENT OF ACTION RESULT |
|---|---|---|---|
| MOVE | ISSUING APPARATUS ID, ORIGIN FROM WHICH MOVE IS STARTED, COORDINATES OF DESTINATION AT WHICH MOVE ENDS, AND SERIES OF COORDINATES OF ROUTES | TO STOP WHEN THERE IS ANY OTHER CHARACTERS ON A MOVING ROUTE | POSITION OF DESTINATION AT WHICH MOVE ENDS |
| ATTACK | ISSUING APPARATUS ID, ORIGIN AT WHICH ATTACK IS FIRED, COORDINATES OF DESTINATION AT WHICH MOVE ENDS, AND SERIES OF COORDINATES OF ROUTES | · TO CONFIRM IF THERE ARE ANY OTHER CHARACTERS AT AN DESTINATION TO BE ATTACKED<br>· TO CONFIRM IF ATTACKING CAN BE AVOIDED<br>· TO CALCULATE A DAMAGE IN RELATION TO A DEFENSE ITEM | ATTACK STATUS |
| MAKING ITEM | ISSUING APPARATUS ID | TO CALCULATE IF A NECESSARY SKILL AND AN ELEMENT ITEM ARE POSSESSED | ITEM STATUS |
| SETTING ITEM | ISSUING APPARATUS ID, KIND OF ITEM TO BE SET, LEVEL, AND STATE | TO CONFIRM AN ITEM AND A CONFIGURATION AT WHICH THE ITEM IS SET | ITEM STATUS |
| TALKING | ISSUING APPARATUS ID, RECEPTION ID, CONTENT OF TALKING, AND MEANS FOR TALKING (WIRELESS, WIRE, LINGUISTIC SYSTEM, OTHERS) | TO CONFIRM A DISTANCE BETWEEN CHARACTERS AND MEANS | SUCCESS STATUS |

FIG. 8(B)

| TITLE OF ACTION COMMAND | CONTENT OF ACTION COMMAND INFORMATION | CONTENT OF ACTION COMMAND CALCULATION | CONTENT OF ACTION RESULT |
|---|---|---|---|
| OTHERS | | • TO CALCULATE A DAMAGE WHEN BEING ATTACKED OR CONTACTING A DAMAGE ITEM (SUCH AS BOMB) DURING MOVE<br>• TO CALCULATE IF RECEPTION MEANS ARE POSSESSED AND THERE ARE ENOUGH RECEPTION SKILLS WHEN BEING TALKED<br>• TO CALCULATE IF THERE IS A POSSIBILITY THAT OTHERS' COMMUNICATION CAN BE INTERCEPTED, PROVIDED AN INTERCEPTION SKILL IS GIVEN AND AN INTERCEPTION ITEM IS POSSESSED | • DAMAGE (WHEN BEING ATTACKED, DAMAGE ITEM)<br>• COORDINATES OF POSITION AT WHICH ATTACK STARTS (WHEN BEING ATTACKED)<br>• CONTENT OF BEING TALKED AND SENDER (WHEN BEING TALKED)<br>• CONTENT OF TALKING AND SENDER (WHEN INTERCEPTION IS POSSIBLE) |

GAME SYSTEM USING COMMUNICATION NETWORK

BACKGROUND OF THE INVENTION

1. Field of the Invention

The present invention relates to a game system, in particular, to a game system in which a plurality of game apparatuses are liked into a single system by way of a communication network and a plurality of players manipulate their own characters to perform a match game on the network.

2. Description of Related Art

Conventionally, as provided by a Japanese patent publication (examined) No. 61-265163, such a game system is known that is configured by connecting two independent game apparatuses through communication means. In this game system, sharing operational information inputted by players and received through the communication means synchronizes the two independent game apparatuses. A large number of pieces of game software that operate on the game system are now available, so that two players can play a match game.

On one hand, a match game is also enjoyed in a game system composed of battery-driven portable game apparatuses. Recent portable game apparatuses are equipped with communication means with infrared rays as well as communication means with a wire (communication cable). Therefore, it is expected that three or more players can participate in a match game at the same time, which is performed in this game system with three or more portable game apparatuses.

However, when the match game is played with the game system configured by connecting three or more independent game apparatuses through communication means, the synchronization of all the game apparatuses will become difficult as the number of connected game apparatuses increases.

In addition, the portable game apparatus furnished with infrared rays communication means provides less outputs, because of the drive with the battery, resulting in that the range to which information on the infrared ray can reach is very short. Accordingly, the match game utilizing the infrared rays communication means must be played in the condition that a plurality of game apparatuses are closely located. This results in such a problem that the controller and screen of a game apparatus manipulated by a certain player is easily seen by a competitor, thus details of the operated contents leaking to the competitor.

SUMMARY OF THE INVENTION

The present invention has been made to overcome the foregoing drawback, and an object of the present invention is to provide a game system that includes three or more game apparatuses synchronized easily.

Another object of the present invention is to provide a game system that includes three or more portable game apparatuses, in which a match game can be played using maximally infrared rays communication unit equipped with each portable game apparatus.

To accomplish the above objects, one aspect of the present invention is constituted to provide a match-play type of game system including a plurality of master game apparatuses connected with each other via wired communication unit; and one or more slave game apparatuses connected with each of the master game apparatuses via wireless communication unit and configured to operate to form one team with each of the master game apparatuses to conduct a match game.

Thus, between teams each composed of a master game apparatus and one or more slave game apparatuses connected to the master game apparatus, a match game can be played with the master game apparatus serving as a key apparatus. Furthermore, a match game can be played strategically between a plurality of teams by communicating information between the master game apparatus and each slave game apparatus in wireless.

Each of the master game apparatuses and each of the slave game apparatuses may include, respectively, input unit for allowing a player to input command information by an operation, and each of the master game apparatuses may include: command information receiving unit for receiving the command information transmitted from all the slave game apparatuses connected with the master game apparatus via the wired communication unit; command information transmitting unit for transmitting, via the wired communication unit, both the command information received by the command information receiving unit and the command information inputted by the inputting unit provided with the master game apparatus, to all the other master game apparatuses; command information performing unit for performing predetermined processing on the basis of the command information received by the command information receiving unit, the command information inputted by the inputting unit provided with the master game apparatus, the command information sent from all the other master game apparatuses, after the command information sent by the command information transmitting unit from all the other master game apparatuses is received; and outcome delivering unit for delivering an outcome of the predetermined processing executed by the command information performing unit to all the slave game apparatuses connected with the master game apparatus via the wired communication unit.

According to the game system thus constituted, each master game apparatus acquires command information from all the slave game apparatuses connected thereto through the wireless communication unit, and communicates both the command information and the further command information provided via the input unit provided with the master game apparatus to all the other master game apparatuses connected thereto through the wired communication unit. Hence, those pieces of command information is shared by all the master game apparatuses, before each master game apparatus performs predetermined processing based on the command information. Each master game apparatus then delivers a result of the performed processing to all the slave game apparatuses connected thereto via the wireless communication unit.

Each master game apparatus representatively executes the communication of information between the teams formed by its master game apparatus and one or more slave game apparatuses connected thereto and the predetermined processing which should be performed based on the command information, with the result that the information can be shared efficiently by all the teams.

The wired communication unit may be configured with infrared rays. It is therefore possible to communicate information between each master game apparatus and the slave game apparatuses by unit of the infrared rays, offering strategical match games between the teams.

Each of the master game apparatuses and each of the slave game apparatuses may be driven by a battery, respectively.

The communication unit on the infrared rays of which range for transmitting information is shorter are used in a certain team, that is, between colleagues, whilst the communication unit on a communication cable of which range for transmitting information is longer are used between teams, that is, between opponents, thereby offering match games of higher strategies. Additionally, the infrared rays communication unit implemented in the battery-driven game apparatus can be utilized effectively.

Each of the master game apparatuses and each of the slave game apparatuses may be, respectively, composed of a portable game apparatus driven by a battery, and a plurality of teams may be formed by combining one of the master game apparatuses with one or more slave game apparatuses connected with the master game apparatus via the communication unit with the infrared rays, and compete for a match game with each other via the wired communication unit.

The communication unit on the infrared rays of which range for transmitting information is shorter, which is equipped with a compact portable game apparatus that can be put into a pocket etc. of clothes, are used in a team, that is, between colleagues, whilst the communication unit on a communication cable of which range for transmitting information is longer are used between teams, that is, between opponents, making it possible for players to play a match game at a variety of places. Additionally, the players of the same team can be located closely to each other to play the game because of using the communication unit on the infrared rays, while players of different teams can be located in the distance to each other to play the game due to the use of the communication unit with the communication cable. Hence a match game can be played in a highly strategical manner.

According to another aspect of the present invention, there is provided a game system includes a plurality of master terminals connected with each other via first communication unit and one or more slave terminals connected with each of the master terminals via second communication unit, each of the master terminals and each of the slave terminals including, respectively, input unit for allowing a user to input command information through an operation, wherein each of the master terminals includes: command information receiving unit for receiving the command information transmitted from all the slave terminals connected with the master terminal via the second communication unit; command information transmitting unit for transmitting, via the first communication unit, both the command information received by the command information receiving unit and the command information inputted from the inputting unit provided with the master terminal, to all the other master terminals; command information performing unit for performing predetermined processing on the basis of the command information received by the command information receiving unit, the command information inputted with the inputting unit provided with the master terminal, the command information sent from all the other master terminals, after the command information sent from all the other master terminals by the command information transmitting unit is received; and outcome delivering unit for delivering an outcome of the predetermined processing executed by the command information performing unit to all the slave terminals connected with the master terminal via the second communication unit.

In this game system, each master terminal acquires command information from all the slave terminals connected thereto through the second communication unit, and transmits to all the other master terminals connected thereto through the first communication unit both the command information and the further pieces of command information provided via the input unit equipped with the master terminal. All the command information can therefore be shared by all the master terminals. Each master terminal performs predetermined processing on the basis of the given command information, then delivers a result of the predetermine processing to all the slave terminals connected thereto via the second communication unit.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 8(A) and 8(B) denote relationships among action commands, contents of action command instruction, contents of action command calculation, and contents of action results.

DESCRIPTION OF THE PREFERRED EMBODIMENT

Figure 1:
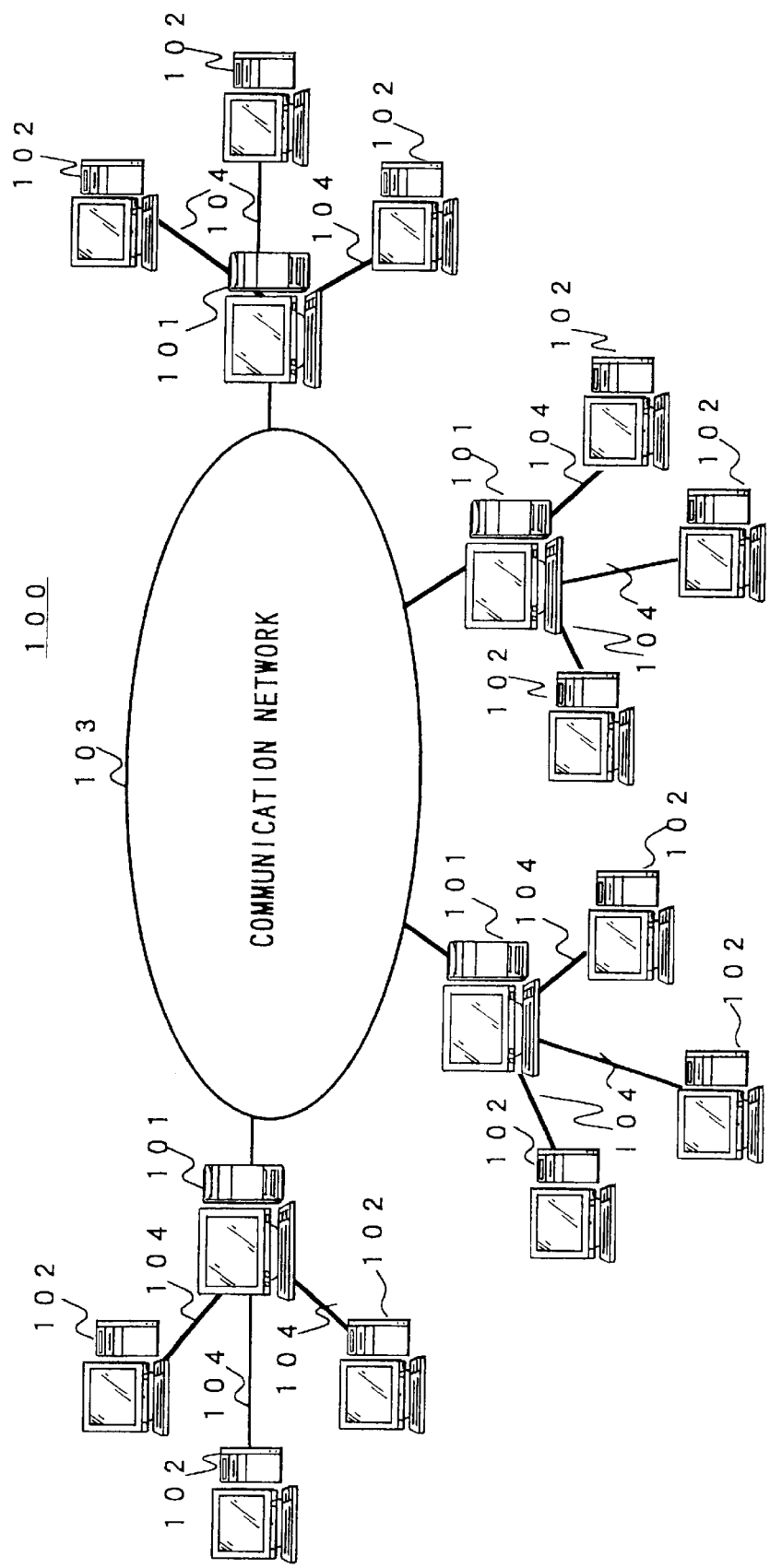
FIG. 1 shows an outlined configuration of a game system according to the present invention.

FIG. 1 shows an outlined configuration of a game system 100 according to the present invention. As shown in FIG. 1, the game system 100 is provided with a plurality of master terminals 101 connected to a communication network composing a first communication means 103 and one or more slave terminals 102 connected to each master terminal unit 101 through a second communication means 104. The master terminals 101 and the slave terminals 102 are each configured into an independent game apparatus. Both of the master terminals 101 and the one or more slave terminals 102 connected to each master terminal 101 through the second communication means 104 make up a single team. The number of teams should therefore be the same as the number of master terminals 101.

In executing a game in the game system 100, each master terminal 101 acquires information with respect to commands corresponding to player's operations from each slave terminal 102 connected thereto through the second communication means 104. In addition, each master terminal 101, in itself, receives information provided by an operator and stores command information corresponding to the provided information. When all the information in one team is prepared, a master terminal 101 of the team transmits through the first communication means 103 the command information to the other terminals 101 connected to the communication network. In consequence, the master terminals 101 on the communication network share the same command information. Each master terminal 101 executes processing specified by the command information. Thereafter each master terminal 101 delivers a result of the executed processing to the slave terminals 102 connected to the master terminal through the second communication means 104. Consequently, a match game between two teams on the network can be played in an effective way.

Figure 2:
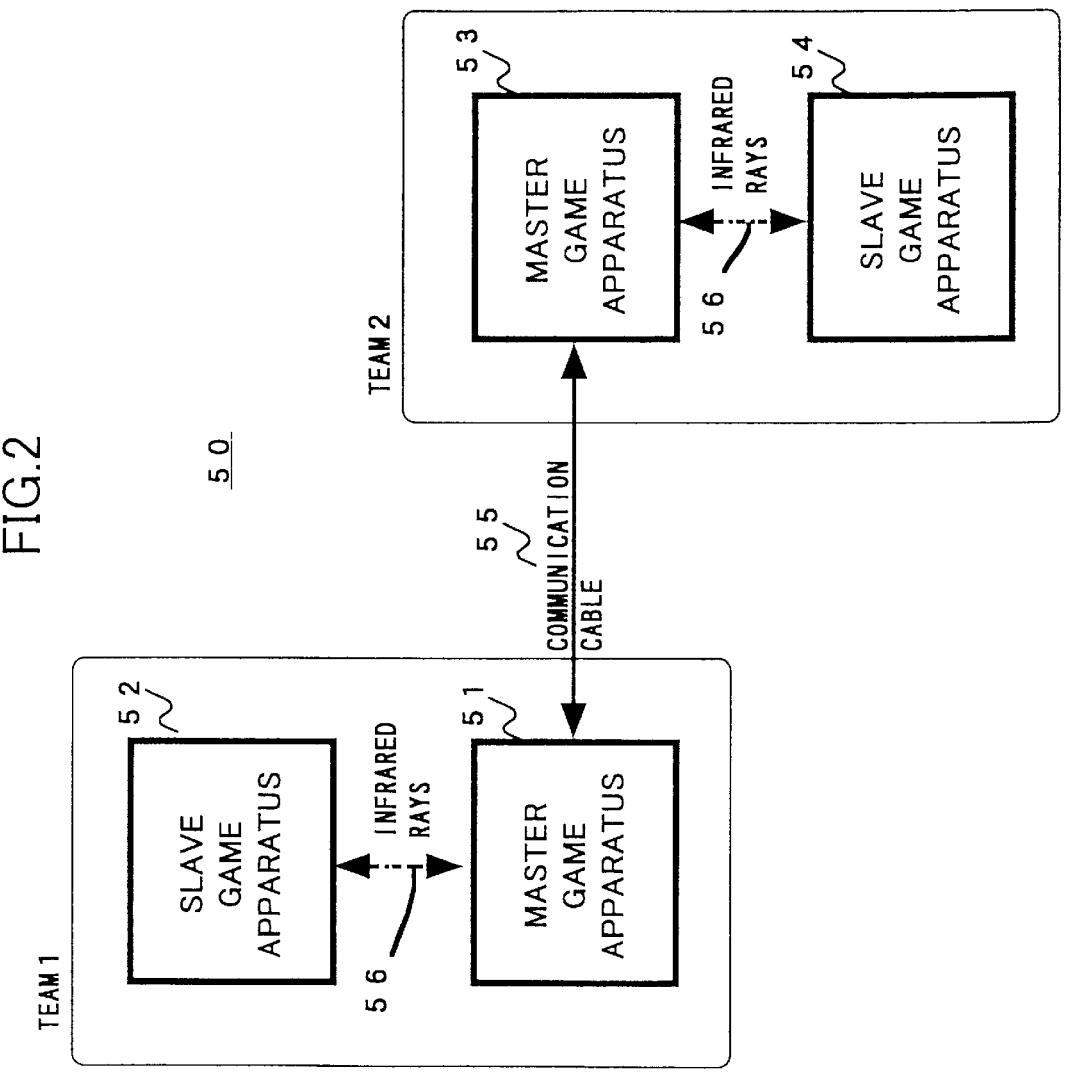
FIG. 2 shows the simplest configuration of the game system shown in FIG. 1.

FIG. 2 shows a game system 50 showing the simplest form of the game system 100 illustrated in FIG. 1, in which a network match game between two teams can be played.

The master terminals 101 shown in FIG. 1 correspond to master game apparatuses 51 and 53 in FIG. 2, the slave terminals 102 shown in FIG. 1 correspond to slave game apparatuses 52 and 54 in FIG. 2, the first communication means 103 shown in FIG. 1 is formed by a communication cable 55 in FIG. 2, and the second communication means 104 shown in FIG. 1 is formed by infrared rays 56 in FIG. 2.

Between the game apparatuses 51 and 52 in one team 1, and also between the game apparatuses 53 and 54 in the other team 2, i.e., between players making up the same team, respectively, information is transmitted and received with infrared rays, while between the game apparatus 51 in one team 1 and the game apparatus 53 in the other team 2, i.e. between players belonging to both opponent sides, information is transmitted and received through the communication cable 55.

Figure 3:
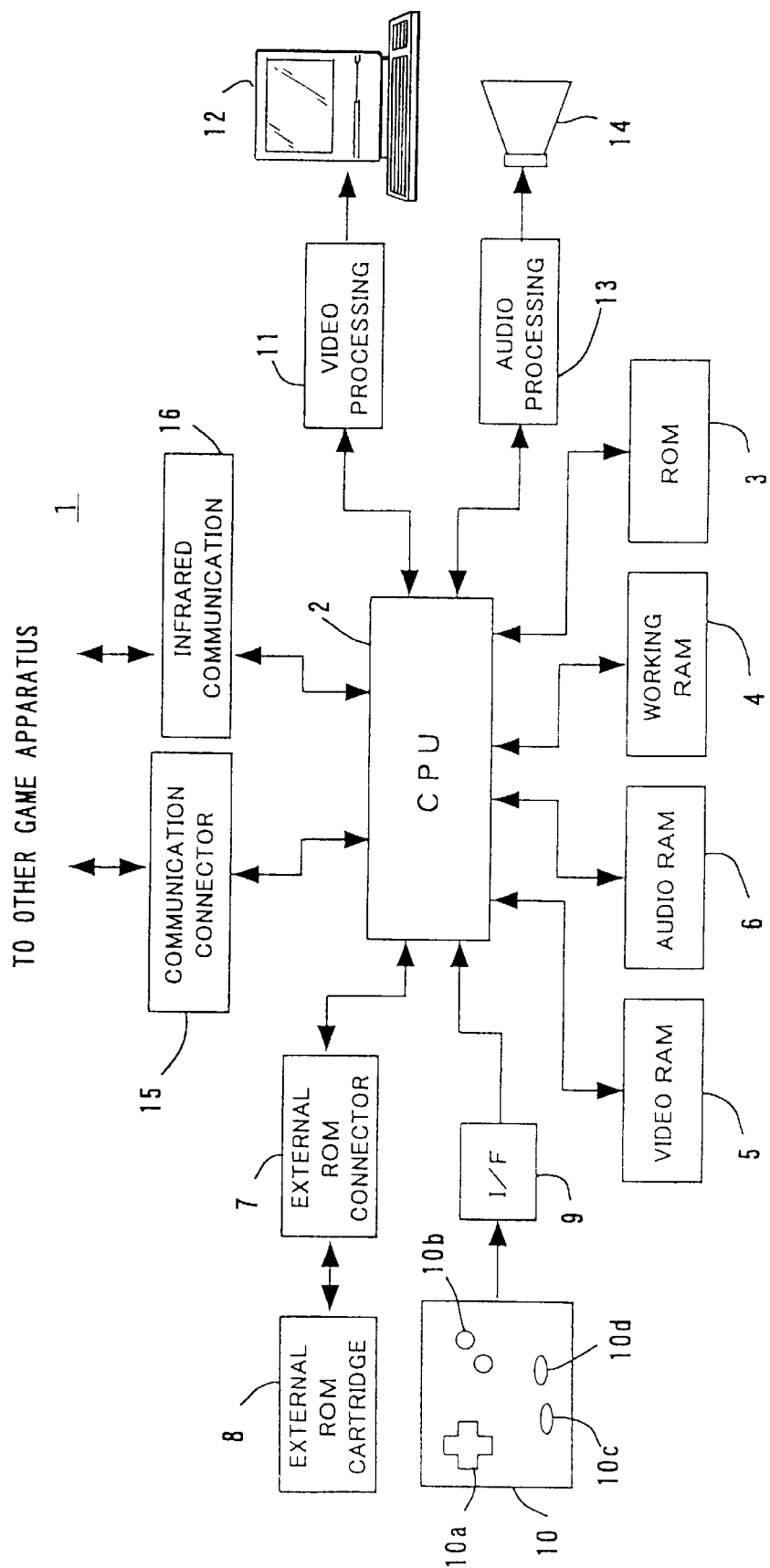
FIG. 3 is a functional block diagram of each game apparatus according to the present invention.

In FIG. 3, a functional block diagram of the game apparatus 51 is shown. The functional block diagrams of the other game apparatuses 52 to 54 are similar to that of the game apparatus 51, so the game apparatus 51 will now be explained representatively. The master game apparatus and the slave game apparatus have basically same functions, and can be exchangeably arranged in the game system 50.

The game apparatus 51 to 54 may be portable game apparatuses driven by not-shown batteries.

As shown in FIG. 3, the game apparatus 51 has a CPU 2 mainly composed of a microprocessor.

An external ROM cartridge 8 is detachably connected to the CPU 2 by way of an external ROM connector 7. A semiconductor memory (ROM, EP-ROM, or others) storing programs of a game according to this embodiment is incorporated in the external ROM cartridge 8. A battery and a battery back-up RAM are also incorporated in the external ROM cartridge 8. Any recording medium, i.e., a CD-ROM, DVD-ROM, or others, may be used as a device to store game programs, wherein a device for reading data from such a recording medium should be connected to the CPU 2.

While making reference to a signal given from a controller 10 through an interface 9, the CPU 2 controls and manages the whole game apparatus in accordance with a game program stored in the external ROM cartridge 8. The CPU 2 also has a function of transmitting and receiving information to and from the other game apparatuses through the communication cable 55 or with the infrared rays 56 on basis of the game program.

Connected to the CPU 2 are a ROM 3 serving as a main storage, a working RAM 4, a video RAM 5, and an audio RAM 6. The ROM 3 memorizes an operating system, which is needed for control of operations of the game apparatus 51, and data necessary for the execution of the control. The working RAM 4 has a plurality of storage areas to temporarily store various bits of information yielded in the course of the game processing. The video RAM 5 temporarily stores a variety of video data read out by the CPU 2 from the external ROM cartridge 8. The audio RAM 6 temporarily stores a variety of audio data read out by the CPU 2 from the external ROM cartridge 8. Instead of such memory configurations, an alternative one may be adopted in which a single RAM to memorize all data stored into the working RAM 4, video RAM 5, and audio RAM 6 is provided.

Further, a controller 10, which is connected to the CPU 2 through the interface 9, serves as an input means that outputs a signal responding to an operation of a player. On the controller 10, arranged are a cross key 10a to be used for specifying a direction of movement of a character displayed on an image display 12 as an object of player's operation or for selecting an action of the character, an enter key 10b to be used for deciding an action of the character, a select key 10c to be used for specifying the display of an action of the character or a status of the character on the image display 12, and a start key 10d to be used for instructing the CPU 2 to start a game. The game apparatus according to this embodiment allows a player to feel as if he or she were a character designated as an object to be operated by the player, which is displayed by the image display 12. Thus, the player is able to move the character according to the game program.

Further, the image display 12 is coupled to the CPU 2 through an video processing circuit 11. In compliance with commands from the CPU 2, the video processing circuit 11 converts video data stored in the video RAM 5 into a video signal to output it to image display 12 at regular intervals. The image display 12 is a display unit to display various game pictures outputted by the video processing circuit 11.

A loud speaker 14 is also connected to the CPU 2 through an audio processing circuit 13. The audio processing circuit 13 converts, under the control of the CPU 2, audio data stored in the audio RAM 6 to an analog audio signal to output it to the loud speaker 14 at regular intervals.

To the CPU 2, still connected are a communication connector 15 and an infrared rays communication unit 16. As shown in FIG. 2, connecting the communication cable 55 to the communication connector 15 enables both master game apparatuses 51 and 53 to exchange bits of information therebetween. Also shown in FIG. 2, the infrared rays 56 generated from the infrared rays communication unit 16 enable the exchange of bits of information between the master game apparatus 51 and the slave game apparatus 52 and between the master game apparatus 53 and the slave game apparatus 54.

These communicating means therefore make it possible for a player to play a network match game against others. However, an output of the infrared rays communication unit 16 is fairly small, because it uses the battery as a power supply. Thus, in order to make the infrared rays communication unit 16 of the slave game apparatus 52 receive information transmitted by that of the master game apparatus 51 in a normal condition, it is required that both infrared rays communication units 16 be located at intervals less than a few centimeters. In this way, a data transmission distance of the communication means with infrared rays 56 is extremely shorter compared to that with the communication cable 55.

Taking advantage of this feature, the present game system 50 is able to communicate information. That is, the infrared rays 56 which have a shorter distance of transmission is used in the same team (between colleagues), i.e., the communication between the master game apparatus 51 and the slave game apparatus 52 in one team and between the master game apparatus 53 and the slave game apparatus 54 in the other team, while the communication cable 55 having a longer distance of transmission is responsible for a communication of information between two teams (team to team), i.e., between the master game apparatuses 51 and 53, thereby executing a match game. In consequence, for playing a match game, players of the same team can place their game apparatuses closely to each other, while players of the two teams can mutually place their game apparatuses in the distance, team by team, using the communication cable 55. Accordingly, players of one team can talk about their tactics without being overheard by the opponents and can play with eliminating situations that the opponents can see operations done on his or her game apparatus screen.

In the following, an explanation about a network match game with the game system 50 will now be given. For the sake of easing an explanation, as described before, let assume that four players divided into two teams, each team consisting of two players, will conduct a network match game.

Figure 4:
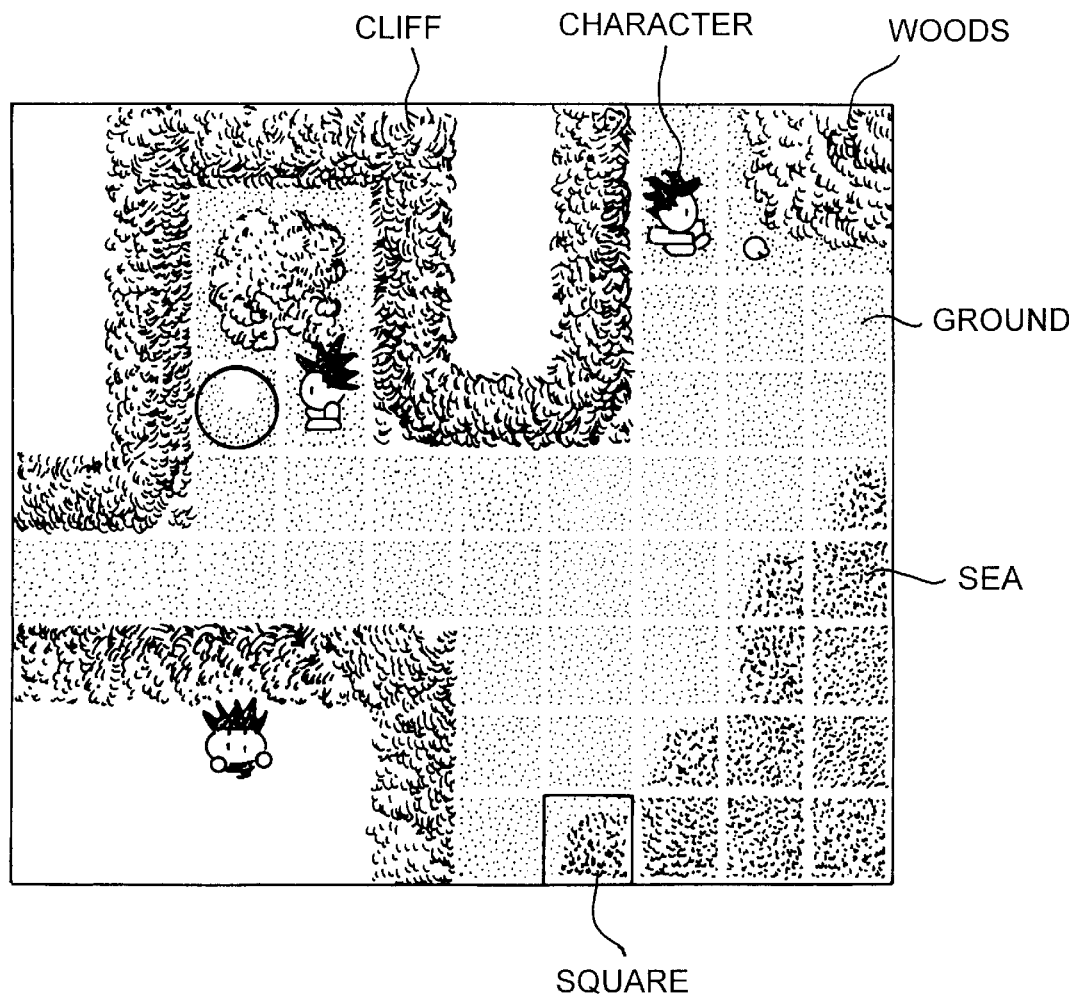
FIG. 4 exemplifies a map displayed on an image display of the game apparatus.

A network match game is played on a map that is displayed on the image display 12, as shown in FIG. 4. The map consists of a number of two-dimensional squares arranged like a grid. The number of squares to be displayed every one frame on the image display 12 is programmed in advance, and characters operated by players are always positioned at any squares in one image displayed on the image display 12.

Players having the game apparatuses 51 to 54 operate characters displayed on the map by using the controller 10. The contents of actions of the characters are linked with action commands displayed on the image display 12 by the CPU 2. Such action commands are previously implemented in the program by a plurality of pieces, specifically including "MOVE", "ATTACK", "DEFEND", "TALK", "WALK", "RUN", "SWIM", "DIVE", "CLIMB", "JUMP", "HIDE", "SEARCH", "MAKE", "THROW", "USE ITEM", "SET ITEM", "PICK UP ITEM", and "COMBINE ITEMS". After a player selects and decides desired one from these action commands, which are displayed on the image display 12, by using a controller 10, the CPU 2 executes on the map specified processing corresponding to the decided action command. For example, when a player selects "ATTACK" out of the action commands, processing which causes a character to be operated by the player to begin attacking another character to be operated by another player is executed on the map.

Numeral values called hit point (hereinafter referred to as "HP") are set to all the characters on the map displayed on the image display 12. The CPU 2 controls each HP so as to decrease when being attacked from other characters, correspondingly to the strength of the attack. There are also some cases where the HP of a certain character decreases because of an event (e.g., to be caught in a trap) that is executed on the map by the CPU 2. And when the HP of a character is reduced to "0", the game is over, as long as it is concerned with the character, and the CPU 2 removes the character from the map. Accordingly, each player must try to control actions of each character not to decrease the HP to "0", and concurrently, it is required for a win to make the HPs of opponent's characters decrease to "0" by any means like an attack at the opponent's characters.

Figure 5:
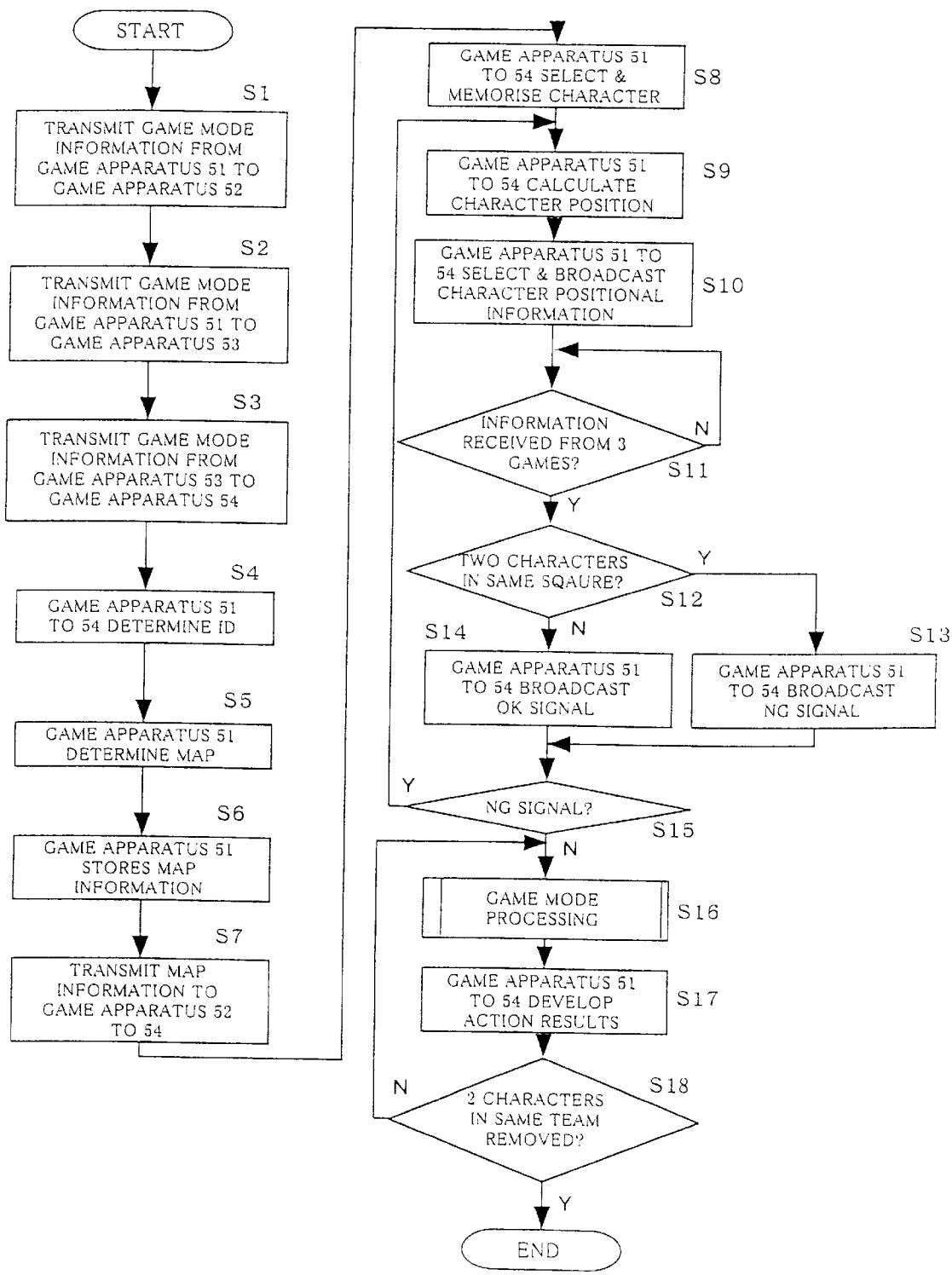
FIG. 5 is a flowchart entirely indicating processing of a network match game played with the game system.
Figures 6A, 6B, 6C, 6D:
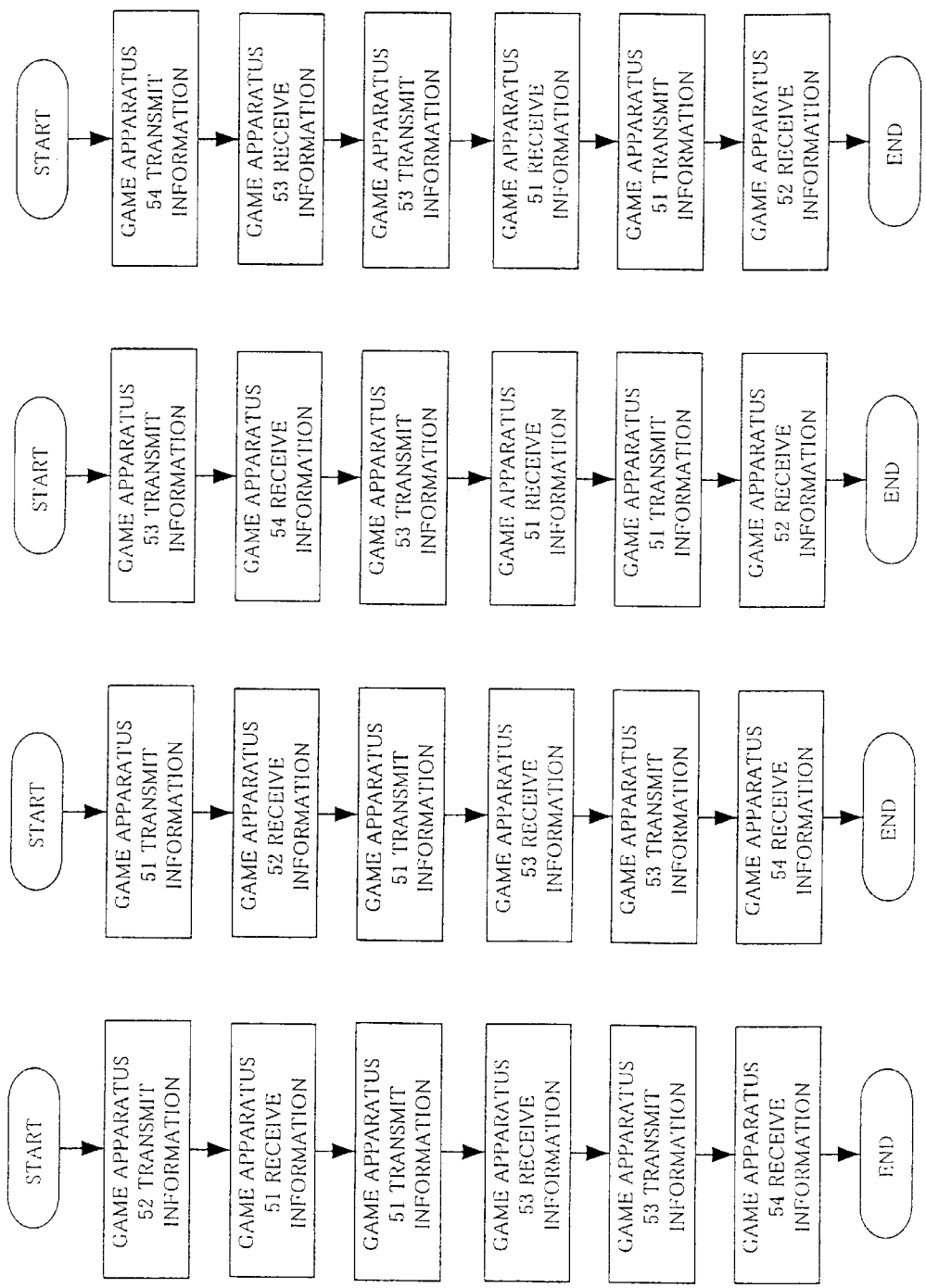
FIGS. 6(A) to 6(D) are flowcharts showing broadcast processing of the network match game played with the game system.
Figure 7:
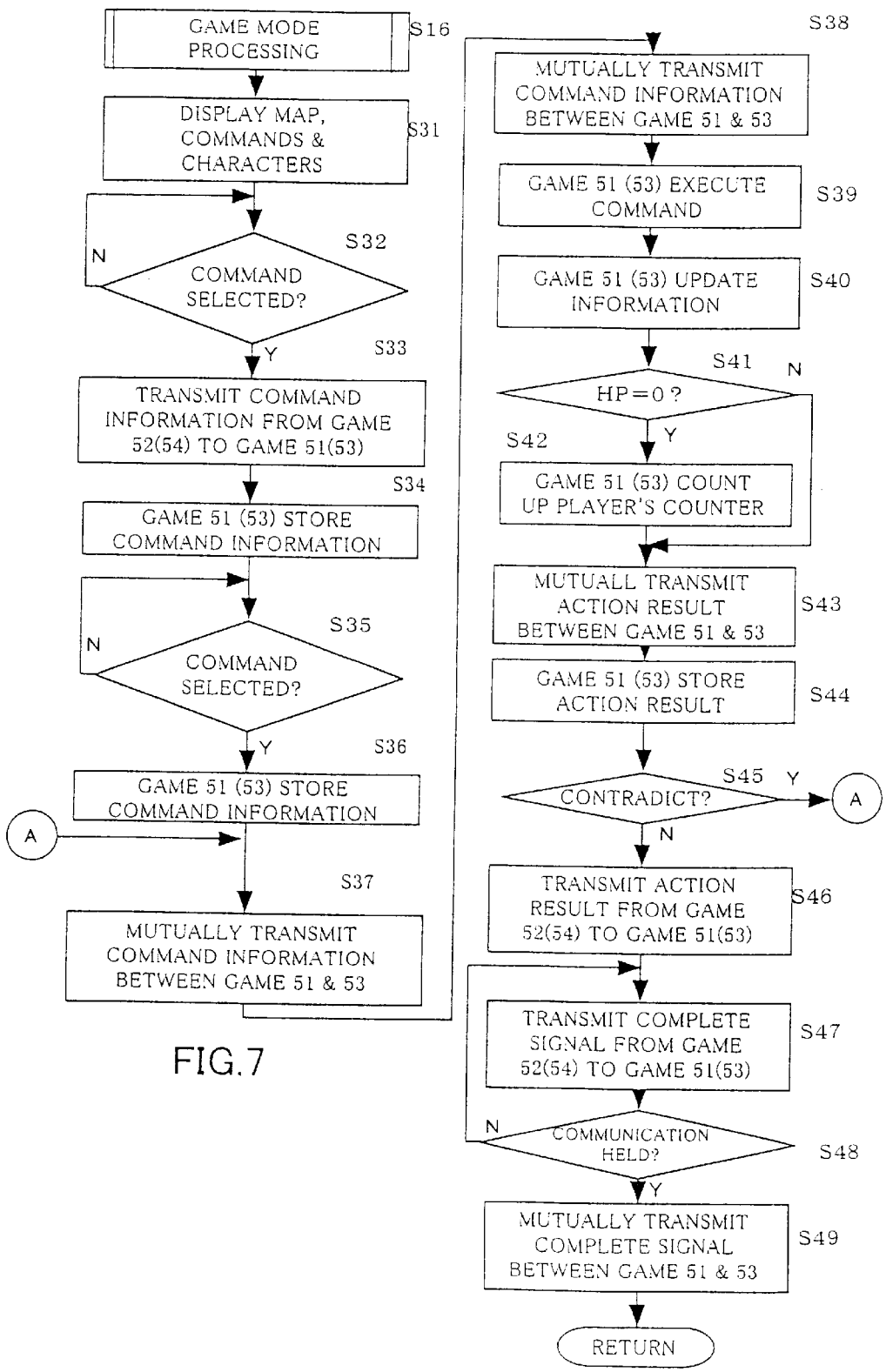
FIG. 7 is a flowchart showing game-mode processing of the network match game played with the game system.

Referring to FIGS. 5 to 7, the operation of a network match game performed with the game system 50 will now be explained.

As shown in FIG. 2, after the game apparatuses 51 to 54 are connected with each other, a player handling the master game apparatus 51 selects a "NETWORK MATCH PLAY" with the cross key 10*a* from a menu displayed on the image displays 12 of the game apparatuses 51 to 54, then presses down the start key 10*d*. Responsively to this, the CPU 2 of the master game apparatus 51 transmits information indicative of a network game mode to the slave game apparatus 52 through the infrared rays communication unit 16 (step S1). The CPU 2 of the master game apparatus 51 also transmits the information to the master game apparatus 53 through the communication cable 55 (step S2).

Thereafter, the CPU 2 of the master game apparatus 53 receives the information indicative of the network game mode transmitted from the master game apparatus 51, and transmits the information to the slave game apparatus 54 (step S3). As a result, the CPUs 2 of the game apparatuses 51 to 54 shown in FIG. 2 recognize the start of a game on the network game mode and store the information into their working RAMs 4, respectively. Though, in this embodiment, the "NETWORK MATCH" is decided by the master game apparatus 51, the other game apparatuses 52 to 54 other than the master game apparatus 51 may be used to decide "NETWORK MATCH" and then to transmit the information to the remaining game apparatuses.

Then, each CPU 2 of the game apparatuses 51 to 54 automatically decides an ID of their own (step S4), and stores it into its working RAM 4. The ID is determined topologically on the basis of a connected condition of the communication means (the communication cable 55 and the infrared rays 56). Alternatively, it is possible that players decide the ID through discussion and input it by themselves.

Next, the CPU 2 of the master game apparatus 51 makes reference to the semiconductor memory incorporated in the external ROM cartridge 8 to automatically determine a map to be used for a match game (step S5), and stores the map into the video RAM 5. The CPU 2 of the master game apparatus 51 then stores information regarding the map (a map number and others) into the working RAM 4 (step S6). The information regarding the map stored in the working RAM 4 of the master game apparatus 51 is transmitted to the other game apparatuses 52 to 54 on the similar processing to the foregoing steps Si to step S3 (step S7). Each CPU 2 of the other game apparatuses 52 to 54 stores into its working RAM 4 the transmitted information regarding the map, and reads out a map corresponding to the information from the semiconductor memory incorporated in the external ROM cartridge 8 to store it into the video RAM 5. Instead, an alternative configuration is such that a player selects the map from any game apparatus at player's discretion.

When each player selects player's character by using the cross key 10*a* on the menu displayed on the image display 12 of each game apparatus, then presses down the enter key 10*b*, each CPU 2 of the game apparatuses 51 to 54 reads out information about the character from the working RAM (step S8). The information about the character include data, such as the name, ability values (parameter values such as the strength of an attack), HP, various kinds of statuses of a character.

Thereafter, each of the CPUs 2 of the game apparatuses 51 to 54 calculates a position of the character on the map, which is to be operated by each player (step S9), and stores it into the working RAM 4.

After each character that each player operates has been decided and the position of each character on a map has been calculated in the game apparatuses 51 to 54, each of the CPUs 2 of the game apparatuses 51 to 54 carries out transmission and reception (hereinafter, referred to as "broadcast") of the information in order to share the information (step S10). The broadcast is carried out as shown in FIG. 6. Specifically, the information that should be held (memorized) by the slave game apparatus 52 is transmitted to the other game apparatuses through the steps shown in FIG. 6(A). The information that should be held (memorized) by the master game apparatus 51 is transmitted to the other game apparatuses through the steps shown in FIG. 6(B). The information that should be held (memorized) by the master game apparatus 53 is transmitted to the other game apparatuses through the steps shown in FIG. 6(C). Furthermore, the information that should be held (memorized) by the slave game apparatus 54 is transmitted to the other game apparatuses through the steps shown in FIG. 6(D).

Additionally, the information that is transmitted and received on the broadcast at step S10 includes the information about the character, the position of the character on the map (hereinafter, referred to as a "CHARACTER POSITION"), and the ID of each game apparatus.

Each of the CPUs 2 of the game apparatuses 51 to 54 then stores the information received on the broadcast into the working RAM 4, and ascertains whether or not the information has been received from all the other game apparatuses (in this case, three apparatuses) (step S11). Each CPU 2 of the game apparatuses 51 to 54 then performs a contradiction-correcting calculation, after the CPU 2 ascertained that the information was received from all the other game apparatuses (3 apparatuses), in other words, all four pieces of information (four pieces of information of which IDs differ from each other) including the information about the game apparatus of its own have been present. In the contradiction-correcting calculation, the four pieces of information with different IDs are compared so as to judge if there is a plurality of pieces of information indicative of the same character position, but different IDs (step S12). That is, it is determined if more than one character is located at the same single square on the map. If each of the CPUs 2 of the game apparatuses 51 to 54 determines that there are plural pieces of information showing different IDs and the same character position, each CPU 2 broadcasts an NG signal (step S13). By contrast, when each CPU 2 determines that there is no such information showing different IDs and the same character position, i.e., when all the character positions are different from each other, each CPU 2 broadcasts an OK signal (step S14).

Then, each of the CPUs 2 of the game apparatuses 51 to 54 ascertains if the NG signal is included in the broadcasted signals (the signals that were received and transmitted on the broadcast) (step S15). In consequence, in cases where each CPU 2 determined at step S12 that there was information showing different IDs and the same character position or where each CPU 2 received the broadcasted NG signal from the other game apparatuses (namely, it received at least one NG signal from the other three game apparatuses), the CPU 2 of each game apparatus returns the processing to step S9, recalculates the character position, and rebroadcast a result of the recalculation. Meanwhile, in cases where not only the CPU 2 of each game apparatus determined at step S12 that there was not any information showing different IDs and the same character position but also each CPU 2 has received no NG signal from any other game apparatus by broadcast (namely, no NG signal has been received from any of the other three game apparatuses), the CPU 2 of each game apparatus finishes initialization processing ranging from step S1 to S15 and transfers to the processing of a game mode (step S16).

The processing of the game mode is shown in FIG. 7. On entering the game mode, each of the CPUs 2 of the game apparatuses 51 to 54 display the map stored in the video RAM 5 on the image display 12 (step S31). Also each CPU 2 makes reference to the character position stored in the working RAM 4 to visualize the character at the specified position on the map. Each of the CPUs 2 of the game apparatuses 51 to 54 also displays an action command selecting image on the map.

When the player of the slave game apparatus 52 selects an action command with the cross key 10a and presses down the enter key 10b (step S32), the CPU 2 of the slave game apparatus 52 stores the action command (command information) into the working RAM 4 and transmits as well the action command to the master game apparatus 51 through the infrared rays communication unit 16 (step S33). The CPU of the master game apparatus 51 receives the action command from the slave game apparatus 52, and stores it into the working RAM 4 (step S34). After this, the slave game apparatus 52 waits for a result of execution of the action command which will be supplied from the master game apparatus 51.

Meanwhile, the player of the master game apparatus 51 selects an action command with the cross key 10a and presses down the enter key 10b (step S35), and the CPU 2 of the master game apparatus 51 stores the action command into the working RAM 4 (step S36). Although, in the above description, the slave game apparatus 52 precedes the master game apparatus 51 in the determination of an action command, the opposite sequence to the above is also usable. Additionally, the processing from steps S32 to S36 is carried out similarly even in the master game apparatus 53 and the slave game apparatus 54. A series of steps S32 to S36 terminate the selection of the action command of each game apparatus belonging to one of the teams, and the game apparatuses come into a transmission-preparing condition in which they prepare for transmission to the other team.

In the case that the master game apparatus 51 or 53 has a plurality of slave game apparatuses connected thereto (slave game apparatuses each capable of communicating bay way of the infrared rays communication unit 16), the master game apparatus 51 or 53 is not brought into the transmission-preparing condition to the other team until the action commands from all the slave game apparatuses are received.

The master game apparatuses 51 and 53 which have completed the preparation for transmission transmit to each other a READY signal through the communication cable 55 (step S37).

When having received the READY signal, each of the master game apparatuses 51 and 53 transmits to each other the action commands (all the action commands offered from one team are included) to be stored into the working RAM 4 through the communication cable 55 (step S38).

The transmission of the action commands between the teams is allowed only when selecting all the action commands in one team has been completed and the READY signal has been received from the other team (if the network is configured with three or more master game apparatuses, it is required that the READY signal has been received from all the other master game apparatuses).

The CPU 2 of the master game apparatus 51 stores the action command received from the master game apparatus 53 into its working RAM 4, and executes all the action commands (step S39). On one hand, the CPU 2 of the master game apparatus 53 also stores the action command received from the master game apparatus 51 into its working RAM 4, and executes all the action commands. Executing the action commands permits each CPU 2 of the master game apparatuses 51 and 53 to carry out calculation of action results; 22, such as interactions between characters, correspondingly to the types of the action commands (titles of action commands; 20) to obtain action results 23, as shown in FIGS. 8(A) and 8(B), and update information, such as the character positions and various statuses, that is stored in each working RAM 4 (step S39). The calculation of the actions includes calculation of an increase or a decrease in the HP assigned to a character operated by each player handling each game apparatus in the game system 50, in which information indicative of exclusion of a character of which HP becomes "0" out of the map is stored into the working RAM 4.

Each of the CPUs 2 of the master game apparatuses 51 and 53 makes reference to the action results to confirm whether or not the HPs of the characters operated by the players of the game apparatuses 51 to 54 reduces to "0" (step S41). And every time when the HP of any character reduces to "0", a player's counter is counted up by one and its updated count is memorized in the working RAM 4 (step S42). For example, if, of all the characters operated by the players, the HPs of three players reduce to "0" (i.e. a condition of "game over" is fulfilled), the player's counter is counted up by three.

The CPUs 2 of the master game apparatuses 51 and 53 then transmit to each other, therebetween, the action results (including the information indicative of the player's counter) through the communication cable 55 (step S43). Alternatively, it is possible that only the CPU 2 of the master game apparatus 51 executes the action command, and broadcasts a resultant action result.

The CPUs 2 of the master game apparatuses 51 and 53 receive the action result transmitted mutually, and store them into their working RAM 4, respectively. Then each CPU 2 the master game apparatuses 51 and 53 compares the action result present in the working RAM 4, which was action-calculated and stored at step S39, with the action command which has been received this time, so that it is determined if the two action commands agree with each other or not (that is, if there is no contradiction between the two action commands) (step S45). As a result of it, when the two action commands do not agree with each other, the CPUs 2 of the master game apparatuses 51 and 53 return to step S37 to execute the mutual transmission processing again, respectively. An alternative way is that the processing is returned to step S32 to repeat the above steps from the selection of an action command. In contrast, where the two action results agree with each other, the CPU 2 of the master game apparatus 51 transmits the action results (control information corresponding to the command) to the slave game apparatus 52 through the infrared rays communication unit 16 (step S46). Also, the CPU 2 of the master game apparatus 53 transmits the action result through the infrared rays communication unit 16 to the slave game apparatus 54.

Responsively to the reception of the action command transmitted from the master game apparatus 51, the CPU 2 of the slave game apparatus 52 updates the corresponding information stored in the working RAM 4, and sends a COMPLETE signal back to the master game apparatus 51 through the infrared rays communication devices 16 (step S47). Further, the CPU 2 of the slave game apparatus 52 confirms the communication state that should be maintained between the master game apparatus 51 and the slave game apparatus 52 by means of an ALIVE signal that has been communicated therebetween via the infrared rays communication unit 16 (step S48). By the confirmation, if it is found that the communication state is not maintained, in other words, where the infrared rays communication is interrupted, the CPU 2 of the slave game apparatus 52 discontinues once the transmission of the COMPLETE signal, then returns to step S47 to restart the transmission of the COMPLETE signal. The processing at steps S47 and S48 is carried out by the slave game apparatus 54 as well. By the way, the above processing to confirm the communication state by communicating the ALIVE signal is carried out at appropriate timing when the infrared rays communication is needed. Such confirmation is carried out from the master game apparatuses as well.

On receiving the COMPLETE signal from each slave game apparatus, the CPUs 2 of the master game apparatuses 51 and 53 mutually transmit the COMPLETE signal therebetween through the communication cable 55 (step S49). This processing leads to the state where the COMPLETE signal is transmitted to all the game apparatuses, which are thus all synchronized. After this, the processing of this game mode returns to the routine shown in FIG. 5.

Then, the CPUs 2 of the game apparatuses 51 to 54, respectively, develop on the map the action results stored in each working RAM 4 (hereinafter referred to as "result display") (step S17). For example, a move of a character and/or a character's attack to another are displayed on the map. A character of which HP reduces to "0" is eliminated from the map.

The CPUs 2 of the game apparatuses 51 to 54, respectively, refer to the working RAM 4 to determine whether or not both characters of one team are eliminated from the map (step S18). If the both are already eliminated, the processing of the game is terminated. In addition, an alternative construction can be provided in which the CPU 2 of each game apparatus may make reference to the working RAM 4 in order to ascertain whether the player's counter is three or not, and if so, the processing of the game comes to an end (e.g., in the case of a round robin event).

In a network match game, the connection of the communication means is kept continuing the game even if one of the characters operated by the player of each game apparatus comes to a "GAMEOVER". However, where the HP of the character operated by the player of the slave game apparatus 52 or 54 become to "0," the connection (the infrared rays 56) may be disconnected, because inputting further action commands are no longer necessary and information will not be transmitted to the slave game apparatus any more.

Further, in the case that the infrared rays communication has been discontinued, selection can be made between bringing only the character assigned to a concerned slave game apparatus into an action-impossible condition and canceling the game itself. Only a master game apparatus is able to make this selection.

In the case that, as a result of a certain action, a character operated by any player fulfills a condition specified on the map, for example, a condition of searching and attacking a particular character, the processing may be designed so that the game comes to an end.

The processing from steps S16 to S18 is carried out repeatedly until the game processing is completed.

In cases where the display of action results needs not be synchronized, the protocols utilizing both of the COMPLETE signal and the ALIVE signal are not necessary. In contrast, if it is desirable that action results be provided at the same time in terms of the progress of a game, the synchronization is taken using those protocols.

Although the game system of the present embodiment has adopted two master game apparatuses and two slave game apparatuses, the game system can be configured by adopting three or more master game apparatuses and three or more slave game apparatuses. In that case, the foregoing communication and control of information, without any changes, can be adopted to synchronizing all the game apparatuses easily.

As described so far, the present embodiment provides a game system equipped with three or more game apparatuses, in which a single team is formed by combining a master game apparatus and one or more slave game apparatuses connected to the master game apparatus via a first communication means. And information is communicated within each team, before information is communicated among a plurality of master game apparatuses connected to each other via a second communication means. Finally, each master game apparatus delivers a result communicated among the master game apparatuses to its slave game apparatuses. Thus, even when the number of game apparatuses composing the game system is raised, all the game apparatuses can be synchronized easily.

Moreover, a network match game is played with a game system equipped with three or more portable game apparatuses, infrared-rays-based communication means provided with the portable game apparatuses, which is shorter in range for transmitting information, is used in the same team, i.e., for communicating information between colleagues, while another communication-cable-based communication means of which range is longer is used between teams, i.e., between opponents. This configuration leads to providing a team match game with high strategy. Still, it is possible to effectively use the infrared rays communication unit equipped with each portable game apparatus.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 11-317192 filed on Nov. 8, 1999 including the specification, claims, drawings and summary is incorporated herein by reference in its entirety.

What is claimed is:

1. A match-play type game system comprising
   a plurality of master game apparatuses connected with each other via wired communication means;
   one or more slave game apparatuses connected with each of the master game apparatuses via wireless communication means and configured to operate to form one team with each of the master game apparatuses to play a game;
   each of the master game apparatuses and each of the slave game apparatuses including, respectively, input means for allowing a player to input command information by an operation; and
   each of the master game apparatuses including:
      command information receiving means for receiving the command information transmitted from all the slave game apparatuses connected with the master game apparatus via the wireless communication means;
      command information transmitting means for transmitting, via the wired communication means, both the command information received by the command information receiving means and the command information inputted by the inputting means provided with the master game apparatus, to all the other master game apparatuses;
      command information performing means for performing predetermined processing on the basis of the command information received by the command information receiving means, the command information inputted by the inputting means provided with the master game apparatus, the command information sent from all the other master game apparatuses, after the command information sent by the command information transmitting means from all the other master game apparatuses is received; and
      outcome delivering means for delivering an outcome of the predetermined processing executed by the command information performing means to all the slave game apparatuses connected with the master game apparatus via the wireless communication means.

2. The game system of claim 1, wherein the wireless communication means is configured with infrared rays.

3. The game system of claim 1, each of the master game apparatuses and each of the slave game apparatuses are driven by a battery, respectively.

4. The game system of claim 3, wherein each of the master game apparatuses and each of the slave game apparatuses are, respectively, composed of a portable game apparatus driven by a battery,
   wherein a plurality of teams are formed by combining one of the master game apparatuses with one or more slave game apparatuses connected with the master game apparatus via the communication means with the infrared rays, and compete for a match game with each other via the wired communication means.

5. A game system comprises a plurality of master terminals connected with each other via first communication means and one or more slave terminals connected with each of the master terminals via second communication means, each of the master terminals and each of the slave terminals comprising, respectively, input means for allowing a user to input command information through an operation,
   wherein each of the master terminals comprises:
      command information receiving means for receiving the command information transmitted from all the slave terminals connected with the master terminal via the second communication means;
      command information transmitting means for transmitting, via the first communication means, both the command information received by the command information receiving means and the command information inputted with the inputting means provided with the master terminal, to all the other master terminals;
      command information performing means for performing predetermined processing on the basis of the command information received by the command information receiving means, the command information inputted from the inputting means provided with the master terminal, the command information sent from all the other master terminals, after the command information sent from all the other master terminals by the command information transmitting means is received; and
      outcome delivering means for delivering an outcome of the predetermined processing executed by the command information performing means to all the slave terminals connected with the master terminal via the second communication means.

* * * * *